(12) United States Patent
Andreychuk

(10) Patent No.: US 8,827,140 B2
(45) Date of Patent: Sep. 9, 2014

(54) COILED TUBING WITH RETAINER FOR CONDUIT

(71) Applicant: Mark Andreychuk, Calgary (CA)

(72) Inventor: Mark Andreychuk, Calgary (CA)

( * ) Notice: Subject to any disclaimer, the term of this patent is extended or adjusted under 35 U.S.C. 154(b) by 0 days.

(21) Appl. No.: 14/022,901

(22) Filed: Sep. 10, 2013

(65) Prior Publication Data

US 2014/0054358 A1 Feb. 27, 2014

Related U.S. Application Data

(62) Division of application No. 12/113,069, filed on Apr. 30, 2008, now Pat. No. 8,567,657.

(60) Provisional application No. 60/914,830, filed on Apr. 30, 2007.

(51) Int. Cl.
*B23K 31/02* (2006.01)

(52) U.S. Cl.
USPC ........ 228/144; 228/151; 228/155; 228/173.6; 228/178

(58) Field of Classification Search
None
See application file for complete search history.

(56) References Cited

U.S. PATENT DOCUMENTS

| | | | | |
|---|---|---|---|---|
| 183,348 A * | 10/1876 | Warhurst | | 138/116 |
| 2,067,078 A * | 1/1937 | Faber | | 4/211 |
| 2,151,206 A * | 3/1939 | Hawthorn | | 138/111 |
| 2,806,429 A * | 9/1957 | Anderson et al. | | 417/112 |
| 2,929,408 A * | 3/1960 | Smith et al. | | 138/38 |
| 3,110,754 A * | 11/1963 | Witort et al. | | 174/70 R |
| 4,066,201 A * | 1/1978 | Bleckmann | | 228/115 |
| 4,200,297 A * | 4/1980 | Tricon | | 277/337 |
| 4,971,147 A * | 11/1990 | Thomeer | | 166/65.1 |
| 5,121,872 A * | 6/1992 | Legget | | 228/148 |
| 5,122,209 A * | 6/1992 | Moore et al. | | 156/54 |
| 5,191,173 A * | 3/1993 | Sizer et al. | | 174/105 R |
| 5,429,194 A * | 7/1995 | Nice | | 166/383 |
| 5,435,351 A * | 7/1995 | Head | | 138/111 |
| 5,456,405 A * | 10/1995 | Stagg | | 228/147 |
| 5,467,826 A | 11/1995 | Miller | | |
| 5,613,631 A * | 3/1997 | Ziemek et al. | | 228/148 |
| 5,920,032 A * | 7/1999 | Aeschbacher et al. | | 174/47 |
| 5,942,132 A * | 8/1999 | Toyooka et al. | | 219/61.2 |
| 5,975,404 A * | 11/1999 | Ziemek et al. | | 228/17.5 |
| 8,413,690 B2 | 4/2013 | Crawford | | |
| 2004/0163801 A1 * | 8/2004 | Dalrymple et al. | | 166/65.1 |
| 2005/0223768 A1 * | 10/2005 | Kelder et al. | | 72/46 |

* cited by examiner

*Primary Examiner* — Kiley Stoner
(74) *Attorney, Agent, or Firm* — Sean W. Goodwin; Linda M. Thompson

(57) ABSTRACT

Coiled tubing with a secured conduit and a method for manufacturing same. A slickline held by a retainer is introduced to the coiled tubing manufacturing process by attaching the retainer and slickline to a metal plate, prior to the metal plate being welded into a tubular. The slickline is unaffected by the welding and heat treatment process or processes. To install the conduit into the coiled tubing, the coiled tubing is unrolled from the reel, the conduit is attached to an end of the slickline and the other end of the slickline pulled to fish the conduit through the coiled tubing, resulting in conduit held within the retainer inside the coiled tubing. In embodiments where a slickline is not used, the conduit can be pumped into the retainer or dropped therein by gravity when the coiled tubing is hung in a wellbore. Alternatively, a heat resistant conduit may be secured within the coiled tubing by attachment directly to the coiled tubing or held therein by a retainer.

16 Claims, 12 Drawing Sheets

FIG. 2A.5

COILED TUBING WITH RETAINER FOR CONDUIT

CROSS REFERENCE TO RELATED APPLICATIONS

This application is a divisional application of U.S. patent application Ser. No. 12/113,069, filed Apr. 30, 2008 claiming priority of U.S. Patent Application No. 60/914,830, filed Apr. 30, 2007, the entirety of which is incorporated herein by reference.

FIELD OF THE INVENTION

The present invention relates generally to coiled tubing. More particularly, the present invention relates to coiled tubing with a conduit secured within the coiled tubing.

BACKGROUND OF THE INVENTION

Coiled tubing (CT) (also referred to as endless tubing or continuous tubing) is frequently used for down hole well completions, operations, servicing, etc.

Coiled tubing is typically manufactured from flat plate which is formed into a tubular, longitudinally (or otherwise) welded, heat treated, pressure tested, and rolled into a coil. Heat treating may include annealing.

Some down hole operations benefit from being able to convey electrical power from surface to the bottom hole assembly (BHA) or to communicate signals from surface to the BHA or from the BHA to surface. Wireline is frequently used for these electrical power (may also be referred to as electric line) or communication signals. Examples include directional control or measurement tools, pressure/temperature and other sensors, packers etc.

Wireline can be loosely inserted into finished coiled tubing, for example, by uncoiling the coiled tubing and then pumping a steel cable through the coiled tubing using a cup and then using the steel cable to pull (fish) the wireline through the coiled tubing and recoiling the coiled tubing, by uncoiling the coiled tubing into a well bore and using gravity to drop the wireline into the CT (U.S. Pat. No. 6,148,925 to Moore), or by pumping the wireline into the coiled tubing with the coiled tubing on the reel (U.S. Pat. No. 5,699,996 and U.S. Pat. No. 5,429,194).

Wireline can instead be inserted into coiled tubing during the manufacturing process, for example, by using a spring guide to position the electrical conductor to the side opposite the welding operation and providing cooling to reduce the heat damage to the electrical conductor (U.S. Pat. No. 5,122,209 to Moore et al.), or by using a cable placement tube which conducts coolant along the electrical conductor to prevent heat degradation (the cable placement tube extending past the welding operation and the subsequent heat treating operation) (U.S. Pat. No. 5,121,872 to Legget).

The unrestrained wireline in coiled tubing has a number of problems, including, when the coiled tubing with wireline combination is roiled onto a reel or unrolled from the reel, the difference in radius of the unrestrained wireline results in slack and length problems, during operations, fluid flow past the unrestrained wireline results in slack problems, birdcaging, and in deviated or horizontal wells, the difference in radius results in slack and length problems.

It is, therefore, desirable to provide coiled tubing with wireline secured within.

SUMMARY OF THE INVENTION

It is an object of the present invention to obviate or mitigate at least one disadvantage of previous methods and apparatus for providing and using coiled tubing with wireline.

The present invention provides coiled tubing with wireline secured within. Due to the common requirement that coiled tubing be heat treated, the wireline may be installed directly where it is heat resistant or is installed in a configuration that it can withstand the heat exposure during heat treatment of the coiled tubing, or may be installed indirectly (with slickline installed first to be replaced with wireline) where the wireline is not heat resistant or is not installed in a configuration where it would normally withstand the heat exposure during heat treatment. The wireline may be attached or otherwise secured to the coiled tubing by adhesive or other bond, or may be attached by retention in a retainer or a chamber.

In one aspect the present invention provides a method of providing coiled tubing from a strip of metal flat plate including attaching a retainer to the flat plate, installing a slickline into the retainer, forming the flat plate into a slit tubular having a longitudinal joint, and welding the longitudinal joint to form coiled tubing.

In one embodiment the retainer is attached and the slickline installed substantially continuously. In one embodiment the retainer is attached and the slickline installed substantially simultaneously. In one embodiment the slickline is frictionally retained within the retainer. In one embodiment, the coiled tubing is subsequently heat treated, for example annealing.

In a further aspect the present invention provides a method of providing coiled tubing with a retained conduit including providing coiled tubing with a slickline retainer having a retainer affixed to the inside of the coiled tubing for releasably retaining the slickline in the welded tubular, and fishing a conduit through the coiled tubing using the slickline.

In one embodiment an end of the conduit is attached to an end of the slickline and the slickline pulled from the coiled tubing leaving the conduit within the retainer in the coiled tubing. The conduit is preferably selected from the group of wireline, electric line, fiber optic line, or tubing. In one embodiment, the coiled tubing is unrolled from a reel before fishing, and rolled onto a reel after fishing.

In a further aspect, the present invention provides a method of performing a down hole operation including providing coiled tubing with slickline axially movably retained within a retainer, fishing conduit through the coiled tubing using the slickline, connecting a bottom hole assembly to the coiled tubing and conduit, and performing the down hole operation.

The conduit is preferably selected from the group of wireline, electric line, fiber optic line, or tubing.

In a further aspect the present invention provides coiled tubing with a retainer affixed to the inside of the coiled tubing for releasably retaining slickline in the coiled tubing.

In one embodiment, the slickline is adapted to be pulled from the coiled tubing to fish a conduit retained within the retainer. The conduit is preferably selected from the group of wireline, electric line, fiber optic line, or tubing.

In a further aspect, the present invention provides a method of providing coiled tubing from a strip of metal flat plate including attaching a heat resistant wireline to the flat plate, forming the flat plate into a slit tubular having a longitudinal joint, and welding the longitudinal joint to form coiled tubing.

In one embodiment, the method further includes heat treating the coiled tubing at a heat treating temperature for a heat treating time, the heat resistant wireline adapted to withstand heat treating the coiled tubing.

In a further aspect, the present invention provides a method of providing coiled tubing from a strip of metal flat plate including attaching a retainer to the flat plate, installing a heat resistant wireline into the retainer, forming the flat plate into a slit tubular having a longitudinal joint, and welding the longitudinal joint to form.

In one embodiment, the method further includes heat treating the coiled tubing at a heat treating temperature for a heat treating time, the heat resistant wireline adapted to withstand heat treating the coiled tubing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only with reference to the attached Figures, wherein:

FIG. 1A illustrates a strip of a flat metal plate for forming a coiled tubing, FIG. 1B illustrates a slit tubular formed from the plate of FIG. 1A, the slit tubular having a longitudinal joint, FIG. 1C illustrates sealing the longitudinal joint in the tubular of FIG. 1B, FIG. 1D illustrates subjecting the tubular of FIG. 1C to heat treatment, and FIG. 1E illustrates the tubular of FIG. 1D undergoing non-destructive examination;

FIG. 2A illustrates a strip of a flat metal plate, FIG. 2A.5 illustrates attachment of a retainer to the plate of FIG. 2A, FIG. 2B illustrates a slit tubular formed from the plate of FIG. 2A.5, the slit tubular having a longitudinal joint, FIG. 2C illustrates sealing the longitudinal joint in the tubular of FIG. 2B, FIG. 2D illustrates subjecting the tubular of FIG. 2C to heat treatment, and FIG. 2E illustrates the tubular of FIG. 2D undergoing non-destructive examination;

FIG. 3A shows a manufacturing configuration where rolls of the flat plate, slickline and the retainer are joined prior to forming the slit tubular, FIG. 3B shows a manufacturing configuration where rolls of the flat plate and the retainer are joined prior to forming the slit tubular and the wireline is installed after the heat treatment, and FIG. 3C shows a manufacturing configuration where rolls of the flat plate and the wireline are joined prior to forming the slit tubular;

FIG. 4A shows an embodiment where the retainer is welded to the flat metal plate and the retainer extends along a select portion of the slickline or wireline, FIG. 4B shows an embodiment where the retainer is sealingly attached to the flat metal plate by spot welding for forming a pressure chamber, FIG. 4C shows an embodiment where the retainer is sealingly attached to the flat metal plate by continuous welding for forming a pressure chamber, FIG. 4D shows an embodiment where an airspace is provided between the slickline or wireline and the flat plate, the figure also identifies a curved portion of the retainer, FIG. 4E shows an embodiment where an airspace is provided between the slickline or wireline and the flat plate, the figure also identifies the sealed pressure chamber being formed by the retainer, FIG. 4F shows an embodiment where wireline is connected or secured to the flat plate without the retainer, and FIG. 4G shows an embodiment where a plurality of runs of slickline or wireline is provided;

FIG. 5A illustrates a coiled tubing comprising a slickline retained in a retainer, FIG. 5B illustrates the coiled tubing of FIG. 5A in an uncoiled position, FIG. 5C illustrates attachment of a conduit to one end of the slickline, FIG. 5D illustrates pulling of the slickline from the coiled tubing for leaving the conduit of FIG. 5C within the retainer in the coiled tubing, FIG. 5E illustrates completion of the step shown in FIG. 5D leaving the conduit within the retainer in the coiled tubing, and FIG. 5F illustrates the coiled tubing comprising the slickline retained in the retainer;

DETAILED DESCRIPTION

Generally, the present invention provides a method and system for providing coiled tubing or other tubular with secured wireline.

Figure 1A:
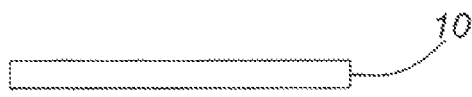
FIGS. 1A to 1E are simplified schematics depicting the steps in a prior art method of making longitudinally welded coiled tubing, more particularly.
Figure 1B:
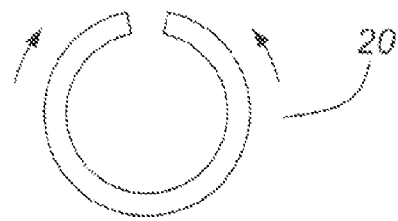
Figure 1C:
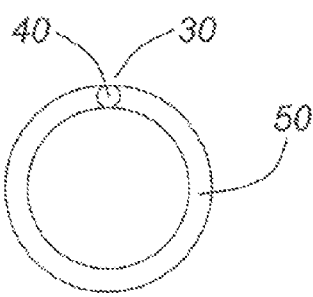
Figure 1D:
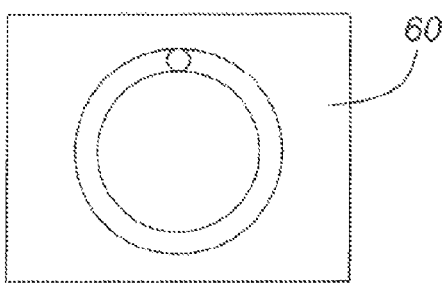
Figure 1E:
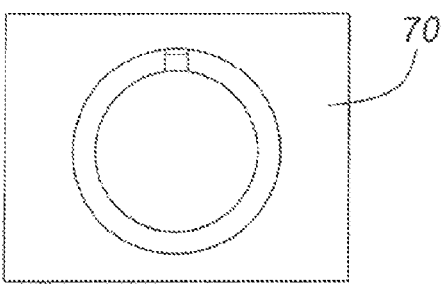

Referring to FIGS. 1A to 1E, the typical (simplified) steps in manufacturing coiled tubing include forming flat plate 10 (e.g. skelp) (FIG. 1A) into a slit tubular 20 forming a longitudinal joint 30 (FIG. 1B), sealing the longitudinal joint 30 (FIG. 1C), for example by application of a weld 40 to form a tubular 50. In other words, steps in manufacturing include forming the flat plate into a slit tubular having a longitudinal joint and welding the longitudinal joint to form coiled tubing. The tubular 50 may be, for example, conventional jointed tubing or coiled tubing. The tubular 50 may then be passed through heat treatment 60 (FIG. 1D), for example annealing or other treatment. The tubular 50 may undergo non-destructive examination and/or testing 70 (FIG. 1E). In the case of coiled tubing, the length of the tubular 50 is then coiled onto a reel.

Figure 2A:
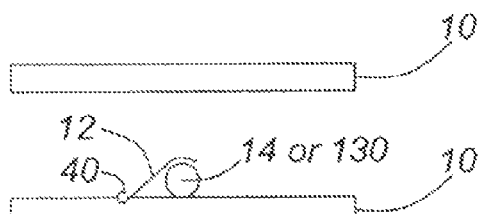
FIGS. 2A to 2E are simplified schematics depicting a method of making coiled tubing in accordance with the present invention, more particularly.
Figure 2B:
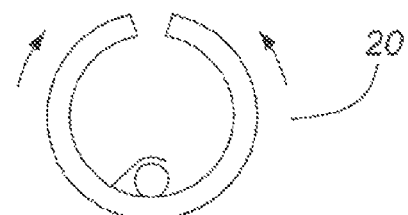
Figure 2C:
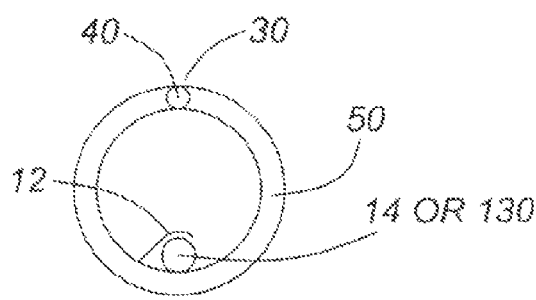
Figure 2D:
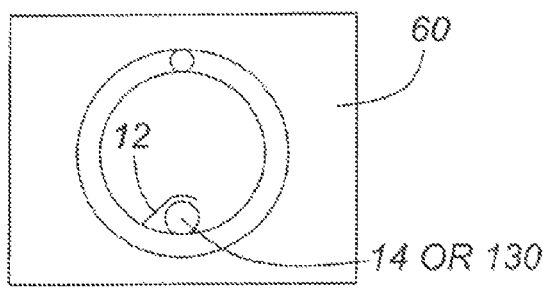
Figure 2E:
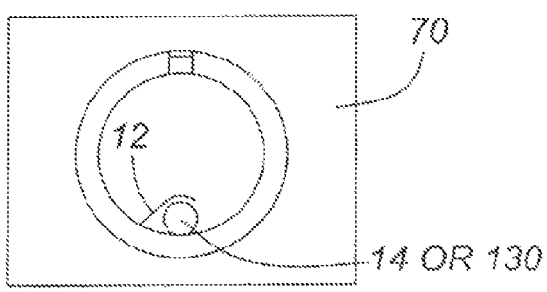

Referring to FIGS. 2A to 2E, a retainer 12 is attached to the flat plate 10 (FIG. 2A) prior to application of the weld 40 to the longitudinal joint 30. As depicted in FIG. 2A.5, the retainer 12 is preferably attached while the flat plate 10 is flat or substantially flat prior to forming, but one skilled in the art would recognize that the plate may be at least partially formed into the slit tubular 20 prior to the attachment of the retainer 12.

The retainer 12 is adapted to retain a wire rope or cable or metallic wire or other flexible member, preferably the retainer 12 is adapted to retain a small diameter steel member known as slick wireline or slickline 14. Alternatively, the retainer 12 is adapted to retain a heat resistant wireline 130.

Figure 3A:
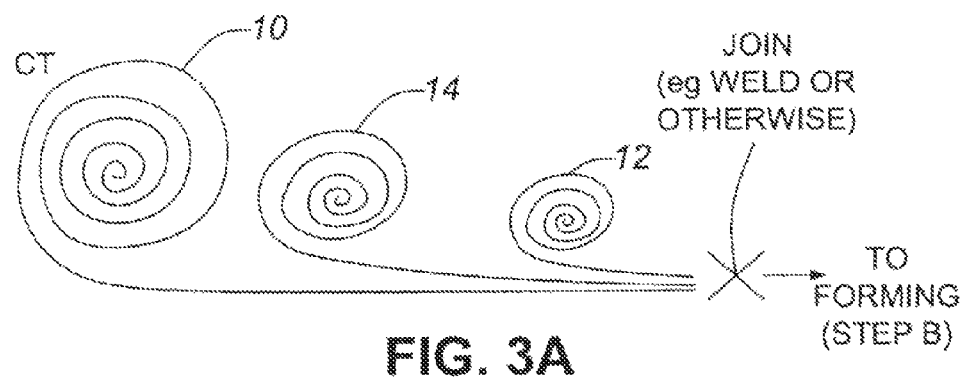
FIGS. 3A to 3C depict two manufacturing configurations of the present invention, more particularly.
Figure 3B:
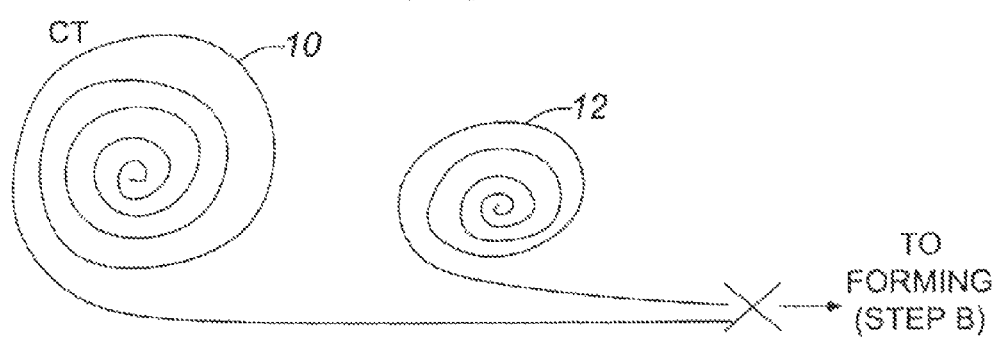
Figure 3C:
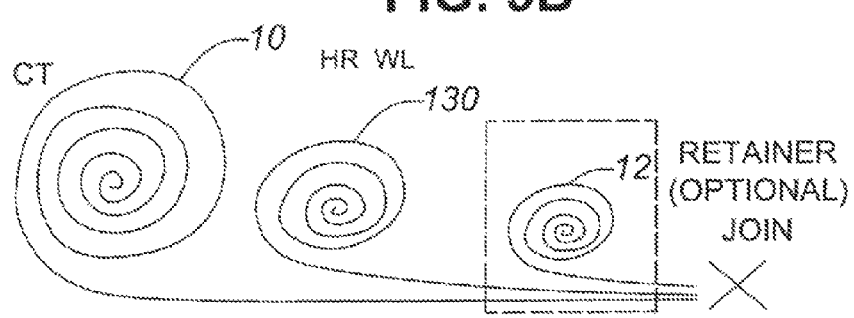

Referring to FIGS. 3A to 3C, representative manufacturing configurations are depicted. In FIG. 3A, rolls of flat plate 10, slickline 14, and retainer 12 (either as flat plate pre-formed into a shaped retainer) may be joined (for example welding) prior to forming the slit tubular 20. The slickline is replaced with the conduit 22 such as wireline 26 after heat treatment 60.

In FIG. 3B, rolls of flat plate 10 and retainer 12 (either as flat plate pre-formed into a shaped retainer) may be joined (for example welding) prior to forming the slit tubular 20. In this configuration, the wireline 26 may be installed into the retainer 12 after heat treatment 60.

In FIG. 3C, rolls of flat plate 10 and heat resistant wireline 130 are joined. Optionally, retainer 12 (either as flat plate or pre-formed into a shaped retainer) may also be joined (for example welding) prior to forming the slit tubular 20.

The manufacturing of tubulars such as joints of conventional tubing or lengths of coiled tubing is preferably a continuous, or semi-continuous process, and preferably the slickline 14 or heat resistant wireline 130, and optionally retainer 12 are introduced into that process at a velocity that is substantially equal to the velocity of the flat plate 10. The retainer 12 may be preformed into a desired shape, or may be formed from flat plate proximate to or as the flat plate 10 is formed into the slit tubular 20.

Figure 4A:
FIGS. 4A to 4G are simplified depictions of a number of alternate embodiments of the present invention, more particularly.
Figure 4B:
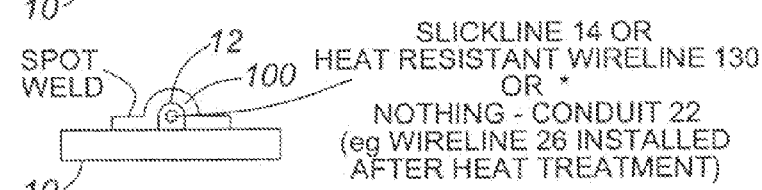
Figure 4C:
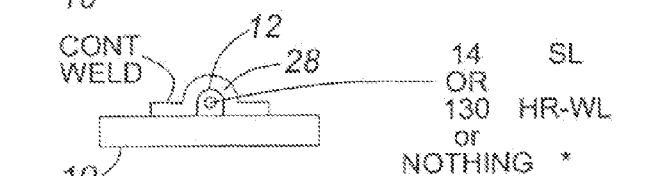
Figure 4D:
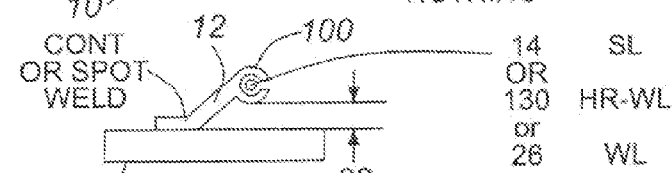
Figure 4E:
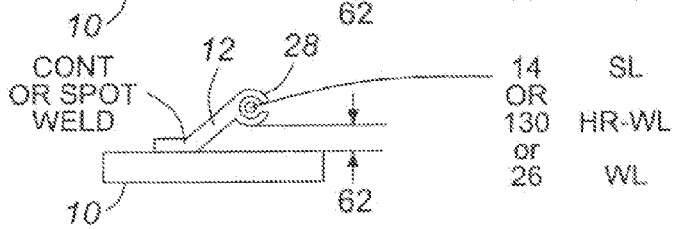
Figure 4F:
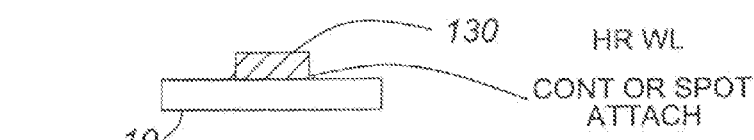

Referring to FIGS. 4A to 4G, embodiments of the present invention are depicted. In one alternate embodiment heat resistant wireline 130 is retained within the retainer 12 rather than the slickline 14. The heat resistant wireline 130 may be adapted to withstand the heat treatment 60, which may be a relatively high temperature but only for a short period of time. In a further alternate embodiment and as shown in FIG. 4F, the heat resistant wireline 130 is connected or secured to the flat plate 10 without a retainer 12, for example by bonding, adhesive, glue or otherwise. The heat treatment 60 may form the bond, for example by thermally activated or cured adhesive or soldering.

In one embodiment and as shown in FIGS. 4D and 4E, the heat resistant wireline 130 may be designed, by material selection, by insulation (air space 62, ceramic etc.) to withstand the heat treatment 60. The heat treatment 60 may include annealing at a suitable temperature and duration (for example 1200 degree F.-1400 degree F. for a duration of seconds). The air space 62 provides insulation between the heat resistant wireline 130 (or wireline 26) so that the heat treatment 60, for example annealing by induction heating, treats the tubular 50, but does not damage the wireline 26 or heat resistant wireline 130.

Figure 4G:
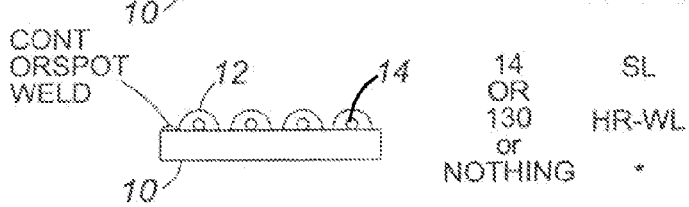

As can be seen in FIGS. 4F and 4G, the heat resistant conduit 130 is connected or secured to the flat plate 10 at a connection between the conduit 130 and the flat plate 10. The connection can be continuous, or semi-continuous such as spot welding.

The retainer 12 is preferably attached to the flat plate 12 by welding but may be otherwise connected, for example by adhesive or integrally formed within the flat plate 12. The retainer 12 may extend along select portions of the slickline 14 or may extend substantially continuously along the slickline 14, forming a track or race 16. The retainer 12 may be spot welded (FIGS. 4A, 4B, 4D, 4E, 4F and 4G) with gaps between adjacent welds), tack welded, etc. to the flat plate 10 along the length of the retainer 12, having a gap between welds to increase flexibility of the retainer 12 relative to the coiled tubing, or the retainer 12 may be fully welded or continuously welded to the flat plate 10 along the length of the retainer 12 (FIGS. 4A, 4C, 4D, 4E, 4F and 4G). The retainer 12 may be made of a material similar or substantially the same as the flat plate 10 thus providing sufficient ductility without the need for gaps between welds.

In certain configurations, the retainer 12 may be continuously welded to the flat plate 10 along the length of the retainer thus forming a sealed pressure chamber 28 (for example, see FIGS. 4C and 4E). The slickline 14 or heat resistant wireline 130 may be installed within the pressure chamber 28 during forming of the slit tubular 20 prior to heat treatment 60, or may be installed subsequently.

The slickline 14 is preferably retained by the geometry of the retainer 12, such that the retainer 12 retains the slickline once the retainer 12 is attached to the flat plate 10, the retainer 12 forming the track or race 16 for the slickline. Preferably, the slickline 14 Is inserted into the retainer 12 prior to the retainer 12 being attached to the plate. The slickline 14 is axially movable within the retainer 12 to provide for pulling the slickline 14 axially from the retainer 12 (see below) but the slickline 14 may be geometrically or otherwise movably retained within retainer 12.

With the retainer 12 attached (and retaining the slickline 14) the coiled tubing is formed into the slit tubular 20, and the weld 40 applied to seal the longitudinal joint 30 to form the tubular 50. The tubular 50 may be, for example, conventional jointed tubing or coiled tubing. The tubular 50 may then be passed through heat treatment 60, for example annealing or other treatment. The tubular 50 may undergo non-destructive examination and/or testing 70. In the case of coiled tubing, the length of the tubular 50 is then coiled onto a reel. The flexible member (e.g. slickline 14) is substantially unaffected by the welding step and heat treatment step or steps etc.

The retainer 12 may optionally form a chamber 28 which may be a sealed (pressure retaining) chamber 28. In which case the chamber 28 is empty (no slickline nor heat resistant wireline is installed during milling of the tubular 50), but wireline may be installed after, for example by pumping the wireline through the cavity or chamber 28 or by hanging the tubular 50 in a well and dropping the wireline into the chamber 28 by gravity.

The retainer 12 may optionally be made of or include non-metallic materials, such as fiberglass, plastic, or ceramic, and may be attached to the flat plate by appropriate means, such as adhesive, glue, fusion, solder, welding etc.

Figure 5A:
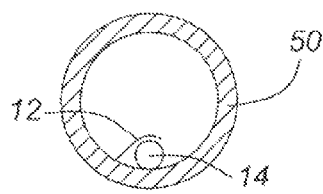
FIGS. 5A-5F are simplified depictions of a method of installing a conduit into a coiled tubing in accordance with the present invention, more particularly.
Figure 5B:
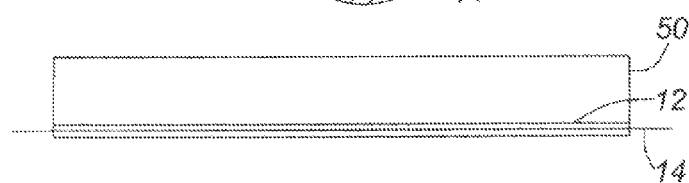
Figure 5C:
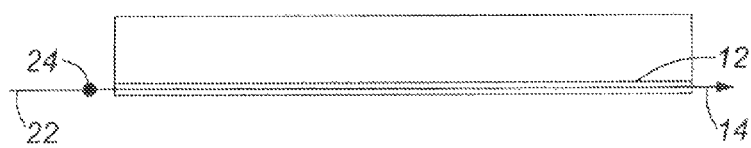
Figure 5D:
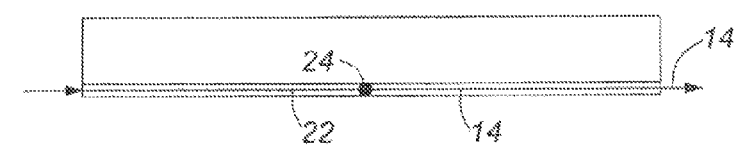
Figure 5E:
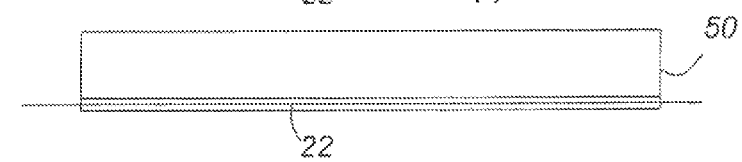
Figure 5F:
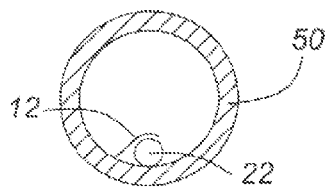
Figure 6:
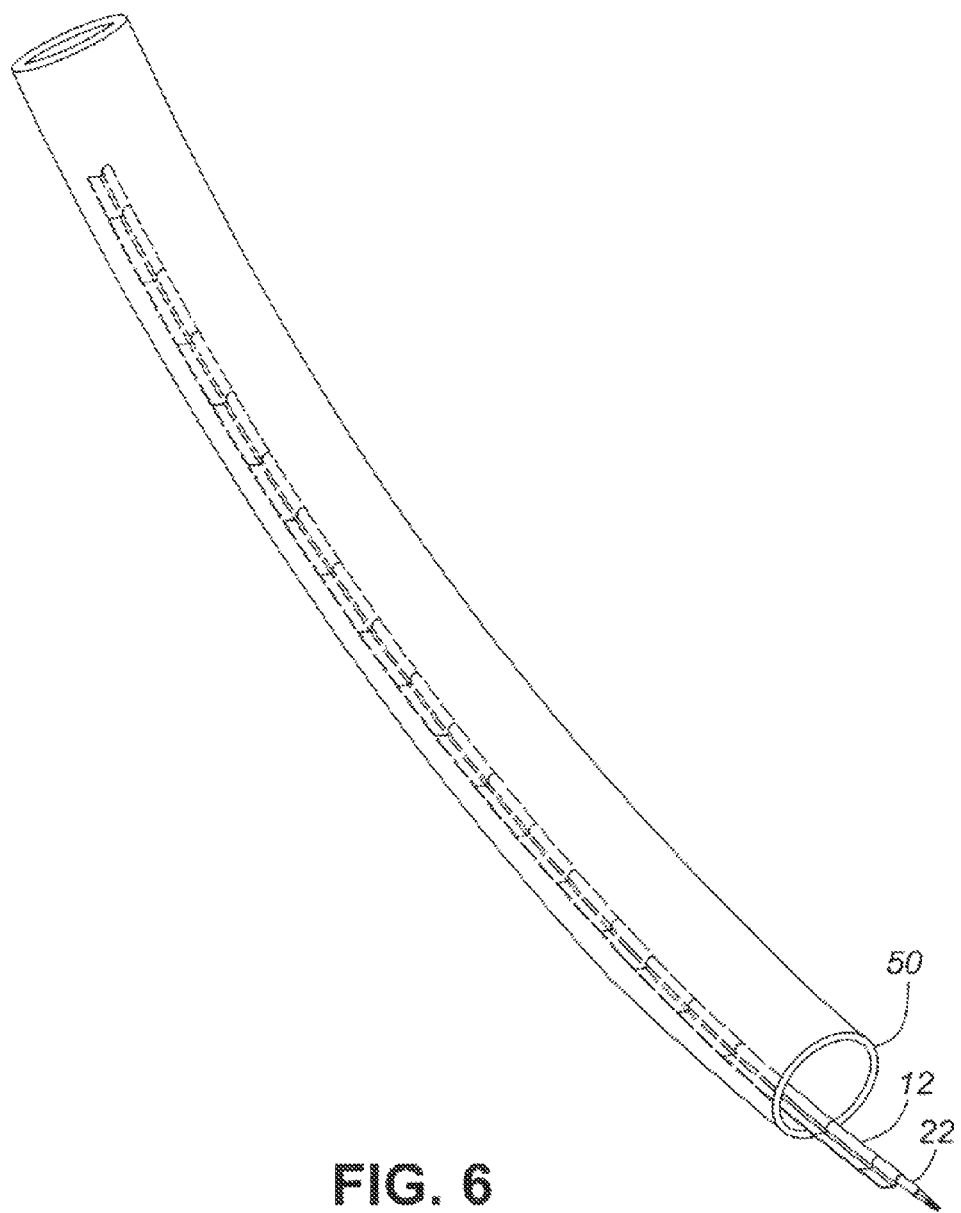
FIG. 6 is a semi-transparent isometric view of coiled tubing with retainer of the present invention.
Figure 7:
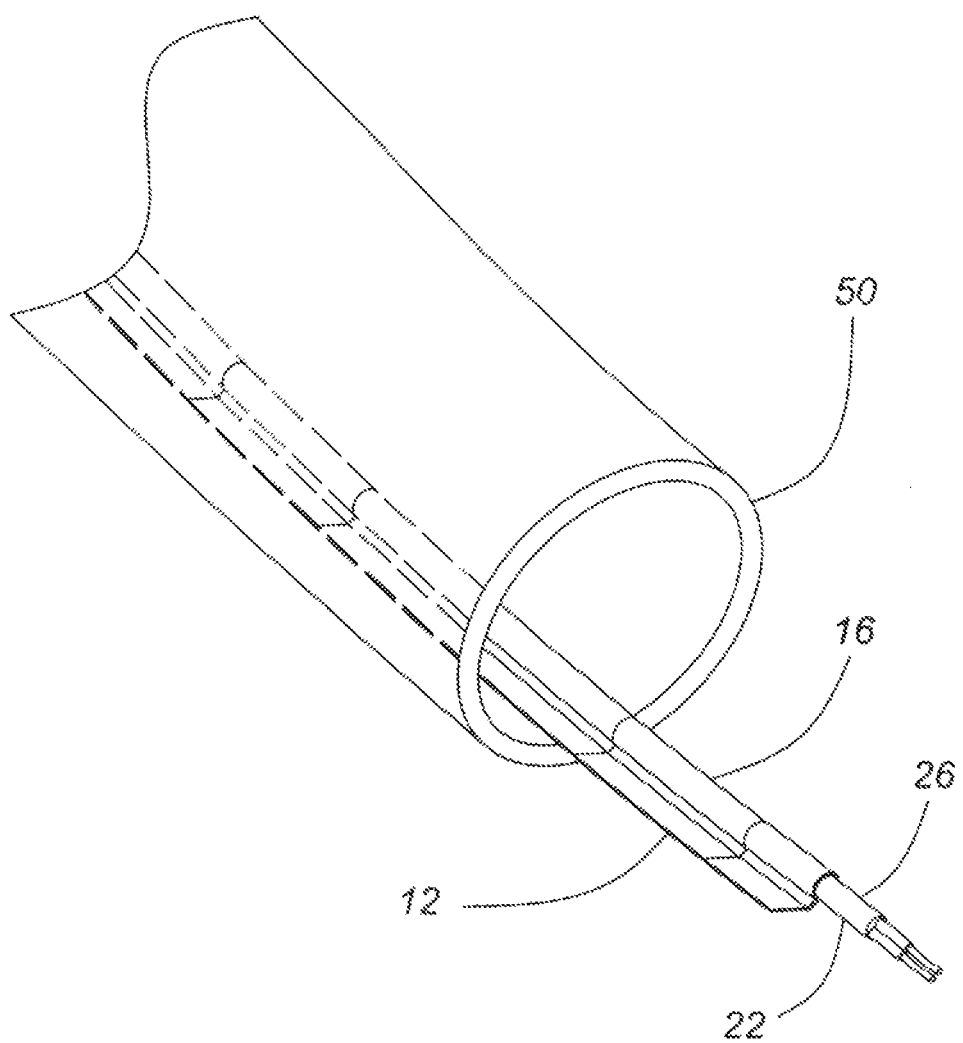
FIG. 7 is a magnified semi-transparent isometric view of the coiled tubing with retainer of FIG. 6.
Figure 8:
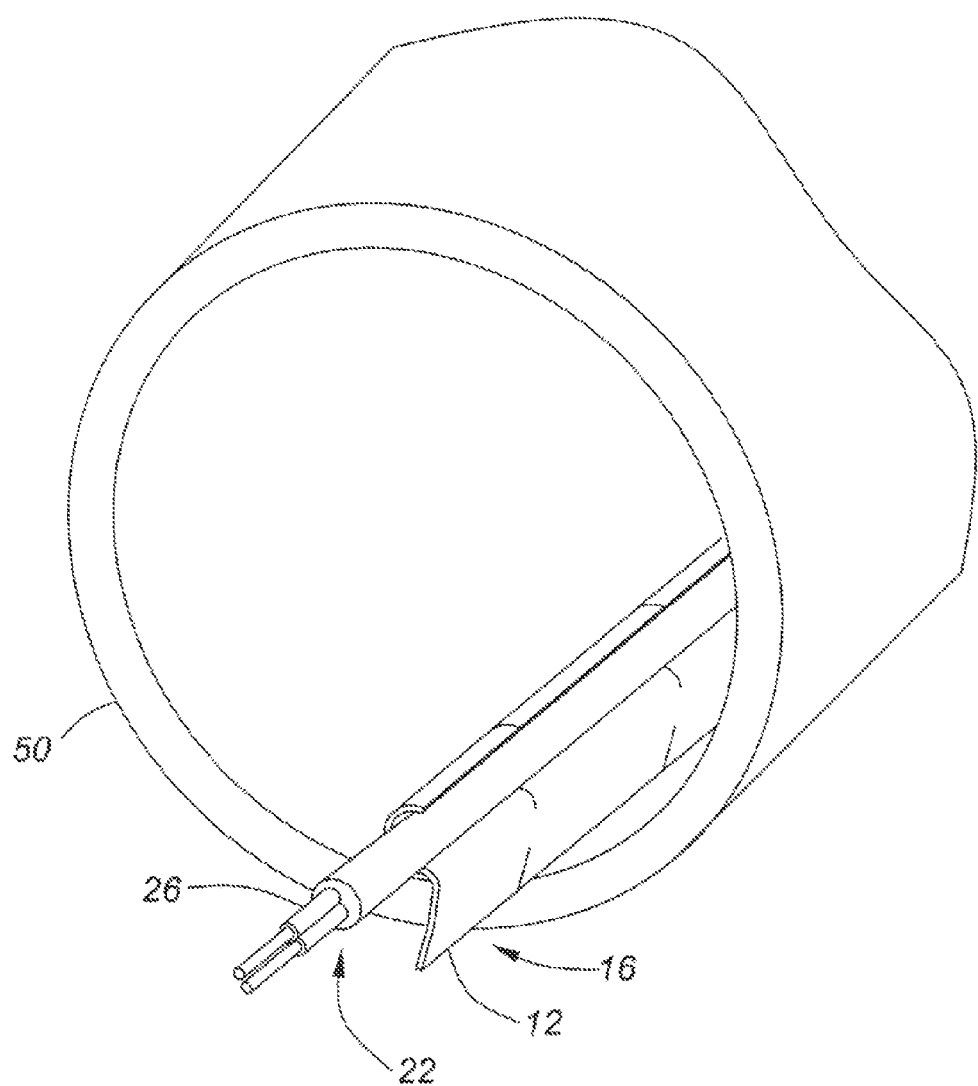
FIG. 8 is a magnified semi-transparent isometric view of the coiled tubing with retainer of FIG. 6.
Figure 9:
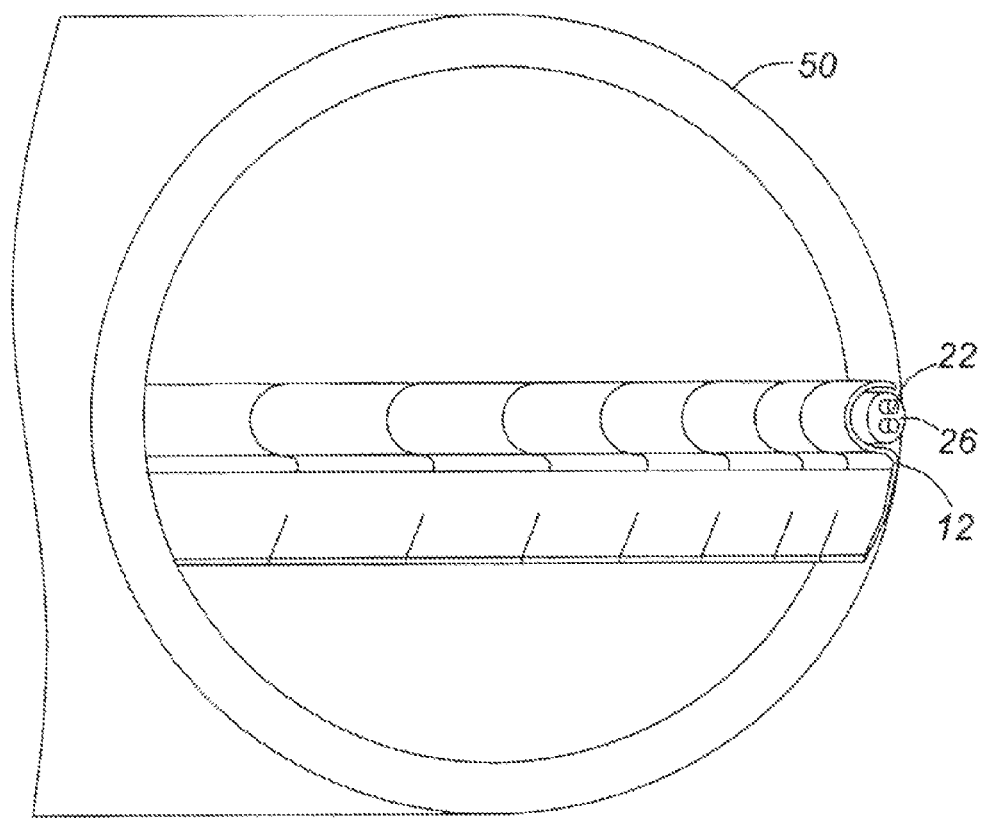
FIG. 9 is a magnified semi-transparent isometric view of the coiled tubing with retainer of FIG. 6.

Referring to FIGS. 5A to 5F, in embodiments where the slickline 14 is first installed and then replaced with the conduit 22, the tubular 50 (FIG. 5A, in this case coiled tubing) having the retainer 12 and the slickline 14 retained in the retainer 12 is uncoiled (FIG. 5B). A conduit 22 is attached to one end of the slickline 14 at attachment 24 (FIG. 5C), and the other end of the slickline 14 pulled to fish the conduit 22 through the retainer 12 such that the slickline 14 is removed from the retainer 12 and replaced with the conduit 22 (FIGS. 5D and 5E). The coiled tubing is then coiled back onto a reel (FIG. 5F). Alternatively, for shorter lengths, the coiled tubing does not have to be uncoiled and the conduit 22 (preferably wireline 26) may be pulled into the coiled tubing on the coil.

While the preferred conduit 22 is wireline or electricline (either for delivery of electrical power to the bottom hole assembly (BHA) or sending/receiving data or control signals to/from the BHA or a combination of power, control, or data), one skilled in the art recognizes that other conduits may be used, for example, single or multiple-conductor coax, single or multiple-conductor cable (for example mono cable, two or three conductor cable or seven strand conductor known as 'hepta cable' etc.), fiber optic, small diameter tubing for fluid conveyance, etc. The wireline may be armored or not, and may be single wrapped or dual wrapped. The wireline may preferably be in the typical size range of between about $7/32"$ and about $3/4"$ but other sizes may be used.

Referring to FIGS. 6-9, a conduit 22 in the form of a wireline 26 or heat resistant wireline 130 (two conductor wireline as just one example) is shown in the retainer 12 within the tubular 50. In the case of regular wireline 26, the wireline 26 may be installed by first installing the slickline 14 and fishing the wireline 26 into the retainer 12 after the heat treatment 60. In the case of heat resistant wireline 130, the heat resistant wireline may be installed directly in the retainer 12 prior to the heat treatment 60.

Figure 10:
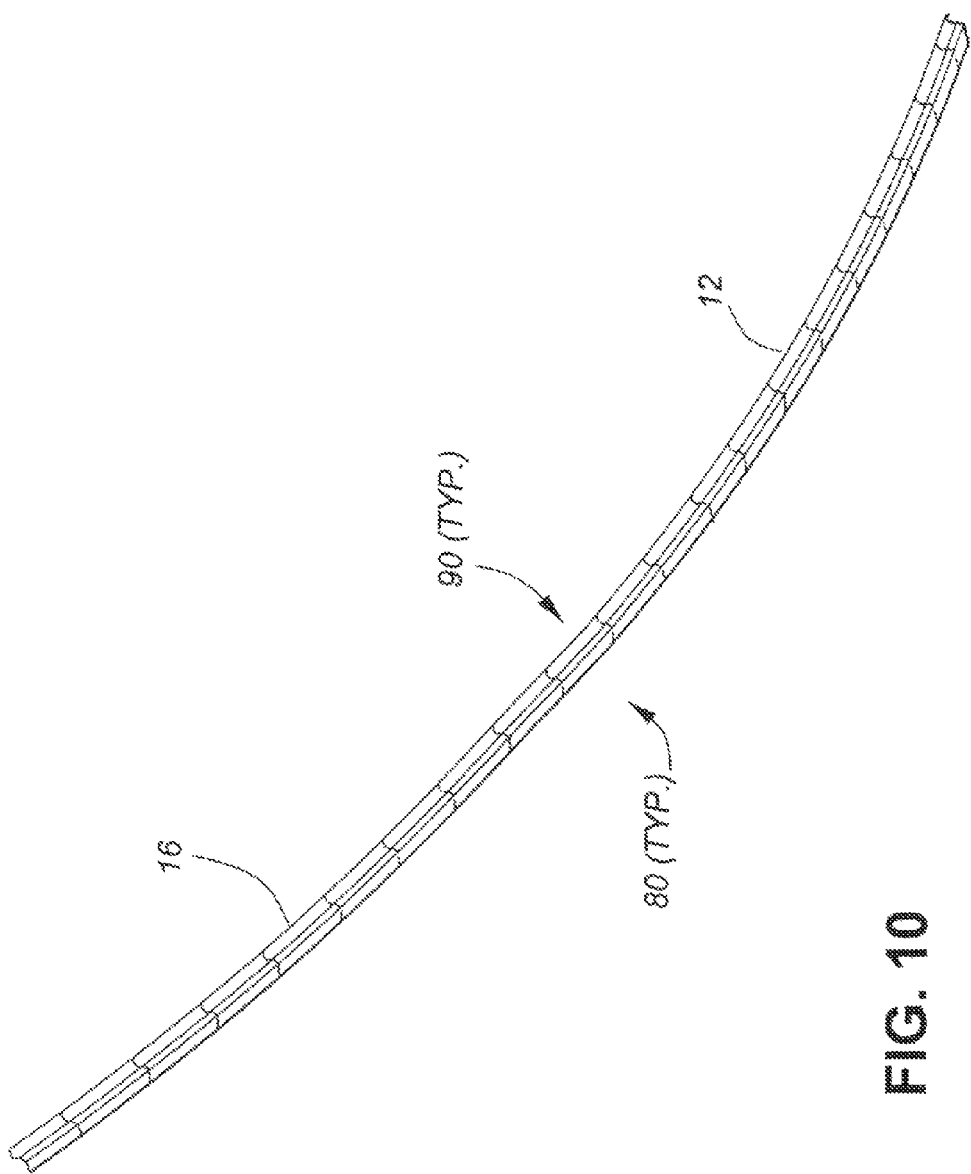
FIG. 10 is an isometric view of a retainer of the present invention.
Figure 11B:
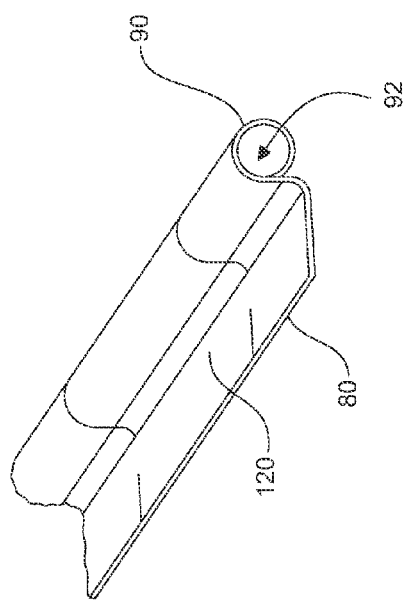
FIG. 11B is an isometric view of the retainer of FIG. 10 wherein the cavity is a sealed cavity.
Figure 11A:
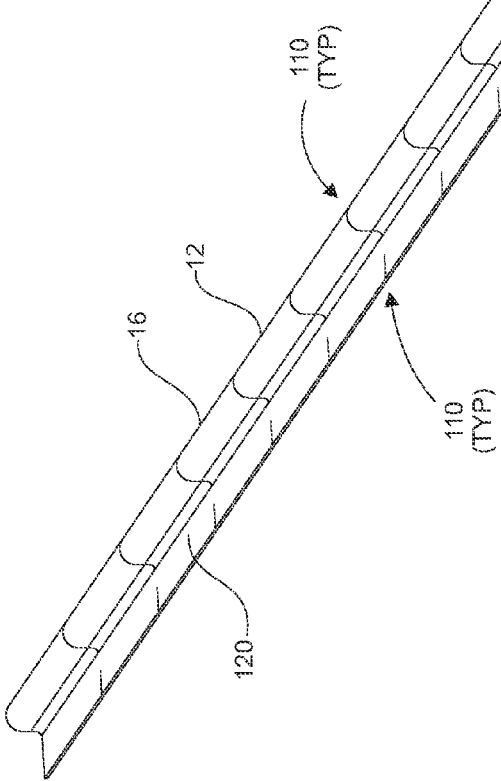
FIG. 11A is a magnified isometric view of the retainer of FIG. 10.
Figure 12:
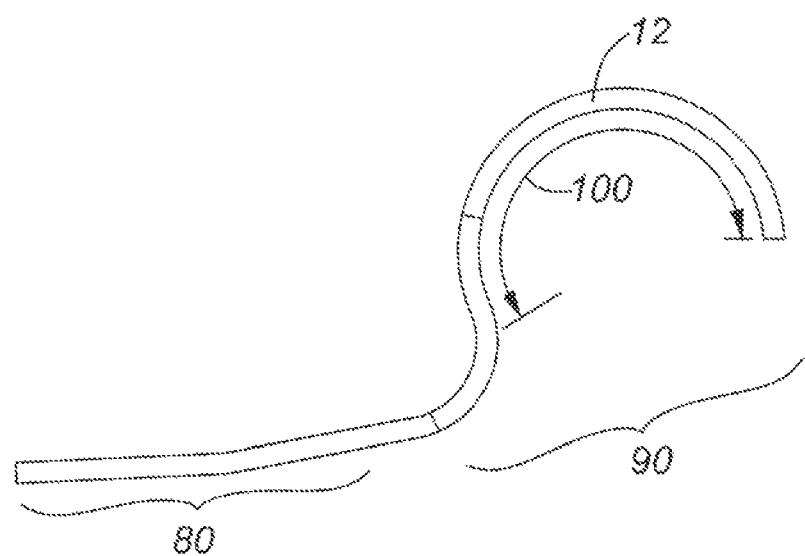
FIG. 12 is a cross-section view of the retainer of FIG. 10.

Referring to FIGS. 10-12, the retainer 12 has a fixed portion 80 and a free portion 90, the fixed portion 80 attached to the flat plate 10 and the free portion 90 extending from the fixed portion 80 to remain unattached. The free portion 90 may include a curved portion 100, the curved portion 100 adapted to frictionally retain the slickline 14 within the retainer 12.

The fixed portion 80 and/or the free portion 90 may include slots 110 along the length of the retainer 12 to increase flexibility. As depicted, the slots 110 may be formed into both the free portion 90 and the fixed portion 80, provided there remains a connection/bridge 120 (see FIG. 9) between adjacent sections. While shown between the fixed region and the free region, the connection/bridge may instead be in the fixed region or the free region. The free portion 90 may form a cavity 92 which may be sealed for retaining pressure (FIG. 11B) or may not be a sealed cavity (FIG. 11A).

In another embodiment, the retainer 12 has two fixed portions 80 with a free portion 90 in-between, forming a double retainer. Alternately, a plurality of runs of slickline 14 or heat resistant wireline 130 may be provided (See FIG. 4G).

While depicted as a continuous retainer 12 forming the track or race 16, one ordinarily skilled in the art recognizes that the fixed portion 80 and/or the free portion 90 could have substantial gaps between adjacent retainers 12. While the retainer 12 is depicted as having slots 110 in the fixed portion 80 and the free portion 90, the retainer may be substantially continuous to provide for the pressure chamber 28 for example by sealingly attaching the retainer 12 to the flat plate 10.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed:

1. A method of providing coiled tubing from a strip of metal flat plate comprising:
    welding a retainer to the flat plate, the retainer being a shaped retainer for retaining a conduit therein, the retainer being welded along a fixed portion to the flat plate, and having a free portion forming a track or race therein for receiving a conduit, the free portion of the retainer remaining unattached from the flat plate;
    forming the flat plate into a slit tubular having a longitudinal joint; and
    sealing the longitudinal joint by welding to form coiled tubing.

2. The method of claim 1, further comprising heat treating the coiled tubing and retainer by annealing the coiled tubing and retainer at an annealing temperature for an annealing time.

3. The method of claim 2 wherein the conduit is wireline that withstands heat treatment of the coiled tubing and retainer at least at annealing temperatures, the method further comprising:
    installing the wireline into the retainer prior to the forming the flat plate into a slit tubular.

4. The method of claim 2 wherein the conduit is single or multi-conductor cable that withstands heat treatment of the coiled tubing and conduit at, at least, annealing temperatures, the method further comprising:
    installing the cable into the retainer prior to the forming the flat plate into a slit tubular.

5. The method of claim 1 wherein the welding of the fixed portion of the retainer to the flat plate is by continuous welding.

6. The method of claim 1 wherein the welding of the fixed portion of the retainer to the flat plate is by semi-continuous welding.

7. The method of claim 1 wherein the welding of the fixed portion of the retainer to the flat plate is by spot welding.

8. The method of claim 2 further comprising:
    installing a flexible member into the free portion of the retainer prior to the forming the flat plate into a slit tubular having a longitudinal joint; and following the heat treating
    connecting the flexible member to the conduit; and
    pulling the flexible member from the retainer, leaving the conduit in the retainer.

9. The method of claim 2, following the heat treating, further comprising pumping the conduit into the free portion of the retainer.

10. The method of claim 9 wherein the conduit is selected from the group consisting of wireline, electric line, fiber optic line and tubing.

11. The method of claim 2, following the heat treating, further comprising:
    hanging the coiled tubing in a vertical wellbore; and
    dropping the conduit into the free portion of retainer by gravity.

12. The method of claim 11 wherein the conduit is selected from the group consisting of wireline, electric line, fiber optic line and tubing.

13. The method of claim 1 wherein the free portion of the retainer comprises a curved portion for frictionally retaining the conduit.

14. The method of claim 1 wherein one or both of the fixed and free portions include slots therealong to increase flexibility.

15. The method of claim 14 wherein the slots are formed in both the fixed and free portions and forming sections therebetween, the retainer having a connection between adjacent sections.

16. The method of claim 1 wherein the free portion of the retainer forms a cavity that forms a sealed cavity.

* * * * *